May 19, 1931.　　　C. B. LIPMAN ET AL　　　1,805,550
WOOD PRODUCT AND METHOD OF PRODUCING THE SAME
Filed Nov. 5, 1927
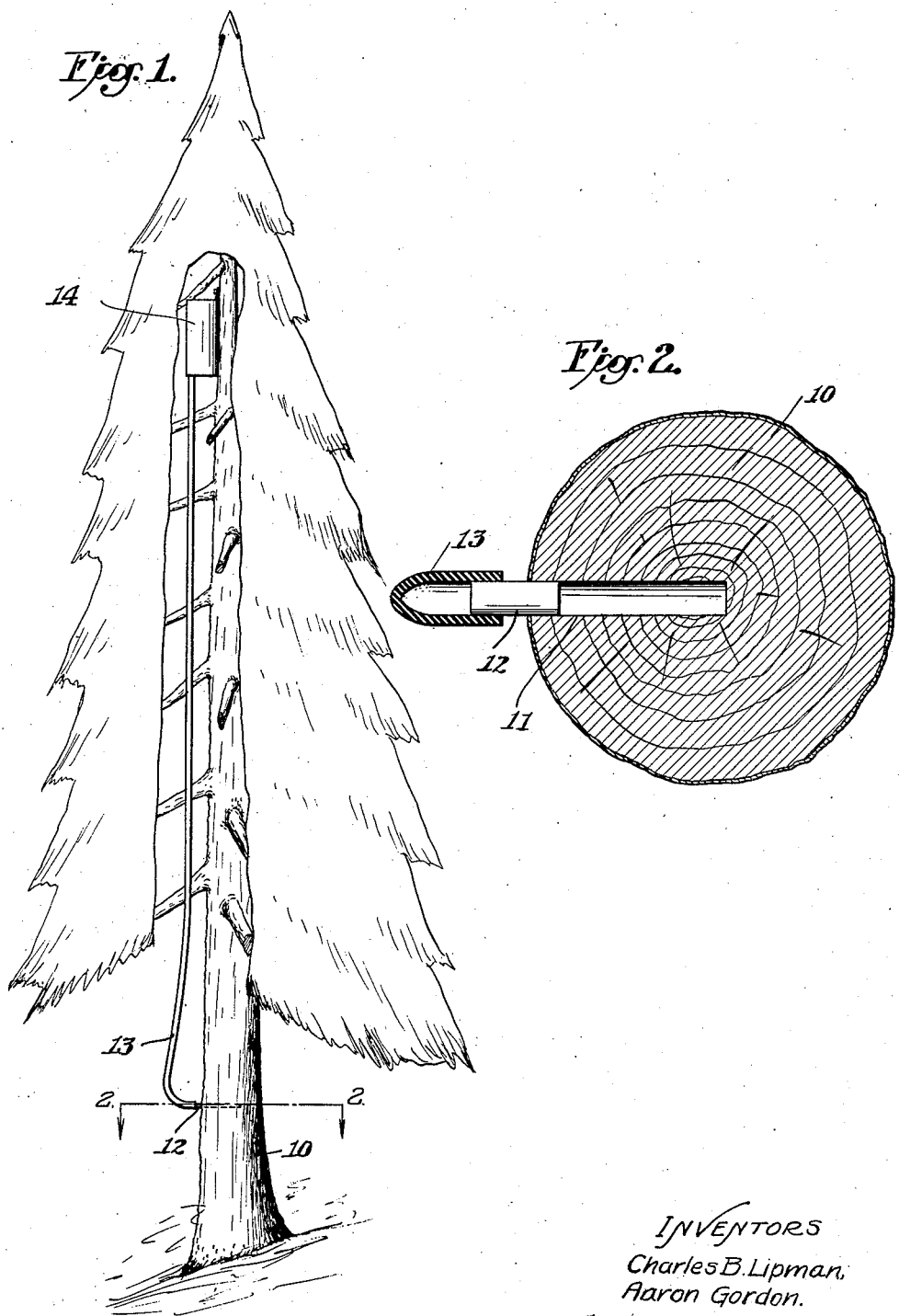
Inventors
Charles B. Lipman,
Aaron Gordon.
Townsend Loftus & Abbett
ATTORNEYS Patented May 19, 1931

1,805,550

UNITED STATES PATENT OFFICE

CHARLES B. LIPMAN AND AARON GORDON, OF BERKELEY, CALIFORNIA, ASSIGNORS TO THE REGENTS OF THE UNIVERSITY OF CALIFORNIA, OF BERKELEY, CALIFORNIA, A CORPORATION OF CALIFORNIA

WOOD PRODUCT AND METHOD OF PRODUCING THE SAME

Application filed November 5, 1927. Serial No. 231,306.

This invention relates to a wood product and a method of producing the same, and embodies improvements and developments in connection with the invention as disclosed in our co-pending application entitled "Method of protecting wood with substances toxic to animal and bacterial life and fungus growths", filed by us September 9, 1926, Serial Number 134,572.

It has been a continuing problem to prepare or protect wooden articles from the action of animal and bacterial life. This problem has demanded considerable thought in connection with piling used in the construction of wharves and docks, and timber used for telephone poles and for railroad ties, etc., and which timbers have been driven into the soil beneath salt water or beneath the soil surface on land and have there been subjected to attack by various forms of animal life, bacteria and fungi. In fact, the ravages wrought by teredos and other wood-boring and wood-attacking organisms have caused damage to the extent of many millions of dollars along the sea coasts of the United States alone. Similar losses occur in timbers partly buried on land, from termite and fungus attack. Continued experiment has proved that most exterior coatings are not impregnable to the attack of these organisms, and that even though the cellular structure of the piling is treated or saturated with toxic substances, the action of the salt water soon renders these substances inert or washes them from the structure; besides, the penetration has never been more than an inch in depth under such treatments.

It is the principal object of the present invention, therefore, to provide a method of impregnating the wood of a live uncut tree with a toxic agent, which will be destructive to organic life, and with which is associated another substance acting to fix the toxic agent within the cellular and fibrous structure of the tree, so that when the tree is subsequently cut and prepared for use, it will be saturated with a fixed toxic agent which will destroy any animal, bacterial, or fungus life attacking treated wood.

The present invention contemplates the direct simultaneous injection of toxic and fixing agents into the vascular system of a living tree, in a manner to insure that these foreign agents will be disseminated throughout the entire tree structure, and will there become fixed so that the fiber of the tree will be permanently saturated with the toxic agent. Said method embodying the use of a liquid reservoir in which the toxic and fixing agents may be placed; a conduit leading therefrom and an injecting nozzle to be inserted into a transverse bore formed in the tree.

The invention is illustrated by way of example in the accompanying drawings in which Figure 1 is a view in side elevation showing the application of the present invention.

Fig. 2 is a view in horizontal transverse section through the trunk of the tree, showing the manner in which the tree is prepared and the foreign agents introduced thereinto.

Referring more particularly to the drawings, 10 indicates the trunk of a tree which is to be subsequently used for piling or for like purposes. Formed transversely of the trunk of the tree and extending radially therethrough is a bore, 11. This may be of any suitable diameter, although for present purposes we have found that the bore formed by a ⅜ to ½ inch bit is sufficient. This bore extends substantially three-quarters through the trunk of the tree, and thus intersects the center of the vascular bundles. After the shavings have been removed a glass tube, 12, is fitted into the bore and forced in a sufficient distance to insure a tight fit. A supply conduit, 13, is connected with the tube and is led to a supply reservoir, 14. This reservoir is preferably disposed some distance above the level of the bore, so that the liquid within the reservoir may be given a sufficient "head" to insure that the solution will be forced into the vascular system of the tree and will move along the courses pursued by the sap of the tree. With the apparatus made ready, as shown in the drawings, it is then desirable to inject a toxic and fixing agent into the tree simultaneously. In our co-pending application, above mentioned, this has not been done in a simultaneous operation, but by two successive steps, but we have discovered many distinct advantages to the method here disclosed.

In the present case we prefer to dissolve freshly prepared copper hydroxide in a solution of ammonium hydroxide or other volatile solvent and the resulting blue solution is then poured into the reservoir and allowed to work its way into the conducting vessels and thence into the wood of the tree through the supply conduit, 13, and the pipe, 12, to the bore, 11. The elevation of the reservoir will determine the hydrostatic head of the liquid, and will cause the liquid gradually to force its way into the tree and be absorbed in the vascular system thereof. When the solution comprising the copper hydroxide dissolved in ammonium hydroxide has been assimilated by the tree, it will be found that upon evaporation of the solvent the toxic agent has become permanently fixed in the cellular structure of the tree, and that it will not be rendered inert, or will not be removed by the action of the elements, or the action of fresh or salt water or of soil within which the article may subsequently be submerged.

While we have indicated that the solution of copper hydroxide in ammonium hydroxide is the toxic agent employed by us, we also found that copper arsenite, or copper arsenate, Paris green, cupric ferrocyanide, or other copper salts, may be used in place of copper hydroxide in a similar manner. Upon evaporation of the solvent, the respective solids of the solution are deposited in the tissues thereby imparting to the wood the specific toxicity of the given salt. Instead of ammonium hydroxide as a solvent we may use solutions of potassium tartrate, or acetic acid. The same end is attained when the toxic solution to be injected is made up of a mixture of copper sulphate and arsenic trioxide dissolved in acetic acid. Such a solution on evaporation of the acetic acid leaves the plant tissue impregnated with Paris green and Scheele's green. After the tree has been completely treated, it is felled and trimmed for use as required. If the tree is to be used as a pile, the bark is peeled off and the tree is otherwise smoothed for driving. It will, of course, be understood that the wood may be used for other purposes, and may be cut into lumber. In any event, however, the toxic agent will remain within, uniformly distributed and fixed throughout the structure of the tree, and will act to render the tree impregnable to the operation of the elements, or to the destructive action of any animal, bacterial or fungus life which attacks the wood.

While we have shown the preferred form of our invention as now known to us, it would be understood that various changes might be made in the combination of elements used to form the toxic and fixing solution, and that variations in the method of injecting the solution into the tree might be employed without departing from the spirit of our invention as claimed.

Having thus described our invention, what we claim and desire to secure by Letters Patent is:

1. A method of protecting wood with a substance toxic to animal and bacteria life and fungus growth, which consists in injecting into a living tree a toxic substance capable of distribution by the sap flow of the tree and permitting the toxic substance to be distributed throughout the entire cellular and fibrous structure of the tree by the actual sap circulation of the tree, and treating said structure simultaneously with the impregnation to reduce and fix the toxic substance within the cellular and fibrous structure of the tree.

2. A method of protecting wood with a substance toxic to animal and bacteria life and fungus growth, which consists in injecting into a living tree a toxic agent, permitting the toxic agent to be distributed throughout the entire cellular and fibrous structure of the tree by the natural sap circulation of the tree, and simultaneously impregnating said structure with a fixing agent to reduce and fix the toxic agent within the cellular and fibrous structure of the tree, whereby the toxic agent and the fixing agent are applied to the tree by a single treatment of the latter.

3. A method of protecting wood with a substance toxic to animal and bacteria life and fungus growth, which consists in injecting into a living tree a toxic agent, permitting the toxic agent to be distributed throughout the entire cellular and fibrous structure of the tree by the natural sap circulation of the tree, said toxic agent being in solution with a reducing agent, whereby the toxic agent and the reducing or fixing agent are simultaneously distributed throughout the entire cellular and fibrous structure of the tree by the natural sap circulation of the tree with a single treatment of the latter.

4. A method of protecting wood with a substance toxic to animal and bacteria life and fungus growth, which consists in injecting into a living tree a toxic agent, permitting the toxic agent to be distributed throughout the entire cellular and fibrous structure of the tree by the natural sap circulation of the tree, said toxic agent being dissolved in a volatile solvent by which the toxic agent is re-precipitated upon evaporation of the volatile solvent, whereby the toxic agent and a fixing agent are simultaneously distributed throughout the entire cellular and fibrous system of the tree.

5. A method of protecting wood with a substance toxic to animal and bacteria life and fungus growth, which consists in injecting a solution of a copper compound into a living tree and permitting the copper compound to be distributed throughout the entire cellular and fibrous structure of the tree by the natural sap circulation of the tree, said copper compound being dissolved in a volatile solvent by which the toxic agent is re-precipitated in the tissues upon evaporation of the volatile solvent, whereby the copper compound and a fixing agent simultaneously are distributed throughout the entire cellular and fibrous structure of the tree by the natural sap circulation of the tree, and by a single treatment of the latter.

CHARLES B. LIPMAN.
AARON GORDON.